(No Model.)

J. PLATTEN, Sr.
CULTIVATOR.

No. 288,111. Patented Nov. 6, 1883.

WITNESSES:
Chas. Nida
C. Sedgwick

INVENTOR:
J. Platten Sr.
BY Munn & Co.
ATTORNEYS.

UNITED STATES PATENT OFFICE.

JOHN PLATTEN, SR., OF FORT HOWARD, WISCONSIN.

CULTIVATOR.

SPECIFICATION forming part of Letters Patent No. 288,111, dated November 6, 1883.

Application filed January 6, 1883. (No model.)

*To all whom it may concern:*

Be it known that I, JOHN PLATTEN, Sr., of Fort Howard, in the county of Brown and State of Wisconsin, have invented a new and useful Improvement in Cultivators, of which the following is a full, clear, and exact description.

Reference is to be had to the accompanying drawings, forming part of this specification, in which similar letters of reference indicate corresponding parts in all the figures.

Figure 1:
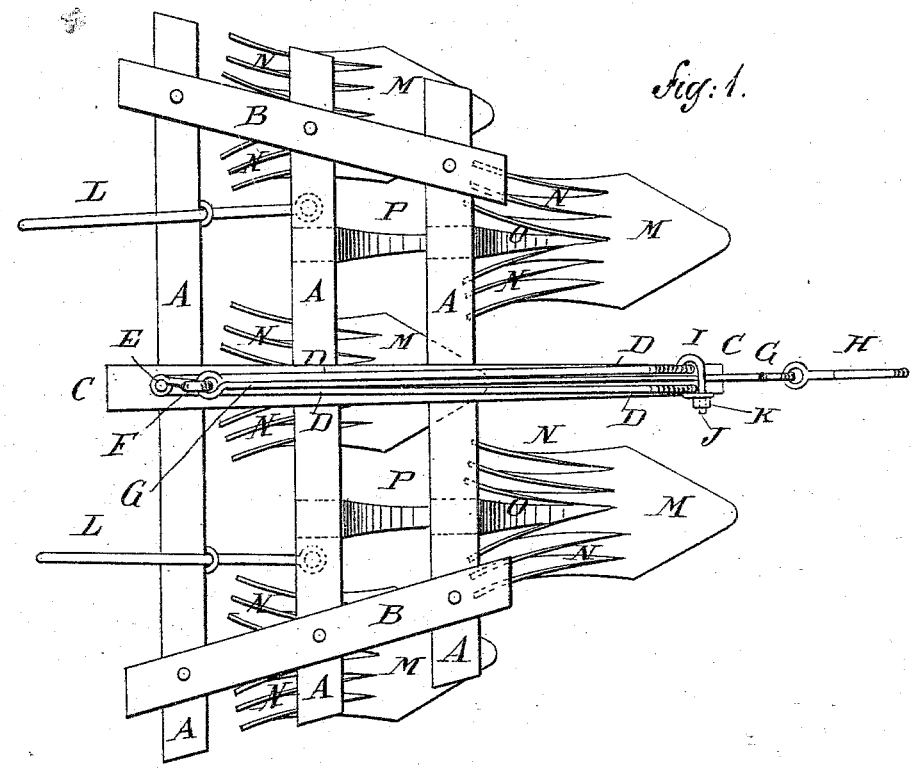
Figure 2:
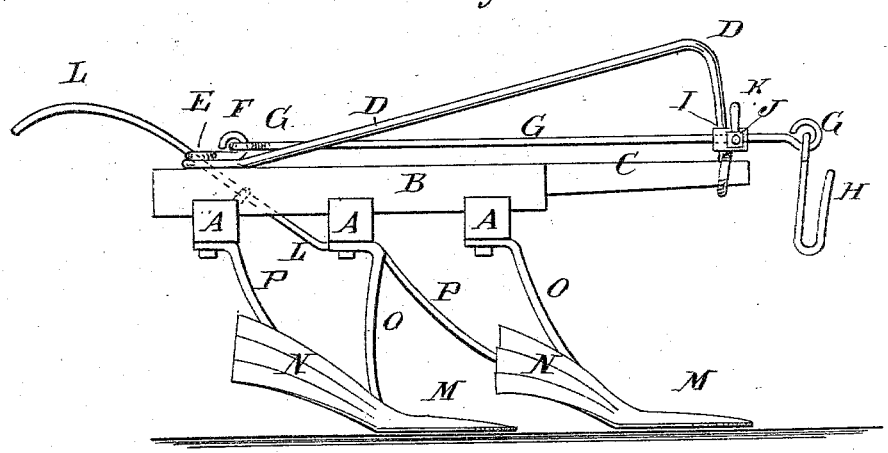
Figure 3:
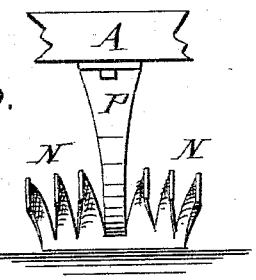

Figure 1 is a plan view of my improvement. Fig. 2 is a side elevation of the same. Fig. 3 is a rear elevation of a part of the same.

The object of this invention is to promote convenience and secure effectiveness in the cultivation of plants, the mellowing of the soil, and the destruction of weeds.

The plows are made with angular forward parts, and with their rear parts cut into strips bent into the form of mold-boards and twisted through a quarter of a turn, so that the soil will sift through or between the said strips, while the weeds will fall to the surface of the ground from the rear ends of the strips. The plows are each connected with the frame by two standards of unequal length, so that the said plows will be firmly supported against the draft-strain, as will be hereinafter fully described.

The frame of the cultivator is formed of three cross-beams, A, connected at or near their ends by two side beams, B, and at their centers by the beam C. Each rear beam A is made a little longer than the next forward beam, and the side beams, B, are placed parallel with the ends of the cross-beams A, which gives their forward ends an inward inclination. The center beam, C, projects in front, to adapt it to serve as a draw-beam, and to its forward end are secured by a ring or other suitable means the forward ends of two parallel rods, D. The rods D extend upward nearly vertically for a suitable distance, and are then bent to the rearward, and inclined downward at such an angle that their rear ends come in contact with the beam C at or near its rear end, where they are secured to the said beam by a bolt, E. The bolt E also secures to the beam C the hook F, to which is hinged the rear end of the draw-rod G. The draw-rod G passes forward between the guide-rods D, and is provided at its forward end with a hook, H, for the convenient attachment of the draft. The forward part of the draw-rod G passes through a clamp, I, secured to the upright parts of the rods D by a bolt, J, and hand-nut K, so that by loosening the nut K the forward end of the draw-rod G can be raised and lowered, to cause the plows to work deeper or shallower in the ground. The depth to which the plows enter the ground can also be regulated by the handles L, which pass through keepers attached to the rear cross-beam A, and their ends are attached to the second cross-beam A, as indicated in Fig. 1.

The forward parts of the plows M are made angular and nearly flat, as shown in Figs. 1 and 2, and their rear parts are divided into parallel strips N by slits parallel with the central line of the plows. The strips N, upon each side of the central lines of the plows, are twisted outward through a quarter of a revolution, and are bent into the form of a mold-board, as shown in Figs. 1, 2, and 3. With this construction, as the machine is drawn forward, the parts M of the plows run beneath the upper part of the soil and cut off the roots of the weeds. As the soil and weeds pass together up the strips N, the soil sifts through between the said strips, while the weeds have the soil shaken from them and drop from the rear ends of the strips N to the surface of the ground, where they quickly wither and die.

To each plow M N are attached the lower ends of two standards, O P, which are made of unequal length. The upper end of the shorter forward standard, O, is attached to a forward cross-beam A, and the upper end of the larger rear standard, P, is attached to the next rear cross-beam A, so that the plows will be firmly supported against the draft-strain.

Three or more cross-beams A can be used, and three, five, or any desired number of plows, as the work to be done may require.

Having thus described my invention, what I claim as new, and desire to secure by Letters Patent, is—

In a cultivator, the combination, with the center beam, C, projected in front of the frame, of the two end bent parallel guide-rods, D, the bolt E, hook F, the draft-rod G, pivoted thereto, and the clamp I, bolted to rods D, as and for the purpose specified.

JOHN PLATTEN, SR.

Witnesses:
ALFRED GASPARD,
HENRY WARNING.